United States Patent [19]

Venable et al.

[11] Patent Number: 4,981,049

[45] Date of Patent: Jan. 1, 1991

[54] TILT-TELESCOPE STEERING COLUMN

[75] Inventors: Frederick D. Venable, Lafayette; Bernard C. Hudgens, West Lafayette, both of Ind.

[73] Assignee: TRW Inc., Lyndhurst, Ohio

[21] Appl. No.: 462,554

[22] Filed: Jan. 9, 1990

Related U.S. Application Data

[62] Division of Ser. No. 277,232, Nov. 29, 1988.

[51] Int. Cl.⁵ .......................... B62D 1/18; F16C 29/02
[52] U.S. Cl. ......................................... 74/493; 384/37; 384/42; 384/272; 403/104; 403/109; 403/371
[58] Field of Search .................. 384/37, 42, 271, 272; 277/61, 115, 116; 285/302; 403/104, 109, 371; 188/67; 74/493

[56] References Cited

U.S. PATENT DOCUMENTS

| 209,160 | 10/1878 | Deavs et al. | 251/214 X |
| 344,723 | 6/1886 | Crocker | 285/302 |
| 778,635 | 12/1904 | Cook | 277/115 |
| 1,927,550 | 9/1933 | Kishline | 384/272 X |
| 2,552,005 | 5/1951 | Fike | 384/272 X |
| 2,839,164 | 6/1958 | Roussel | 188/67 |
| 3,009,747 | 11/1961 | Pitzer | 384/272 |
| 3,570,322 | 3/1971 | Krouse | 74/493 |
| 4,033,158 | 7/1977 | Chamberlain et al. | 74/493 X |
| 4,619,548 | 10/1986 | Kazaoka et al. | 74/493 X |
| 4,649,769 | 3/1987 | Venable | 74/493 |

Primary Examiner—Allan D. Herrmann
Attorney, Agent, or Firm—Tarolli, Sundheim & Covell

[57] ABSTRACT

"A tilt telescope steering column assembly comprises a housing supported for tilting movement, a tubular member supported for axial movement in the housing, and a steering shaft supported for rotation in the tubular member. Axially spaced bearings engage the housing and the tubular memeber to take up clearance therebetween".

7 Claims, 8 Drawing Sheets

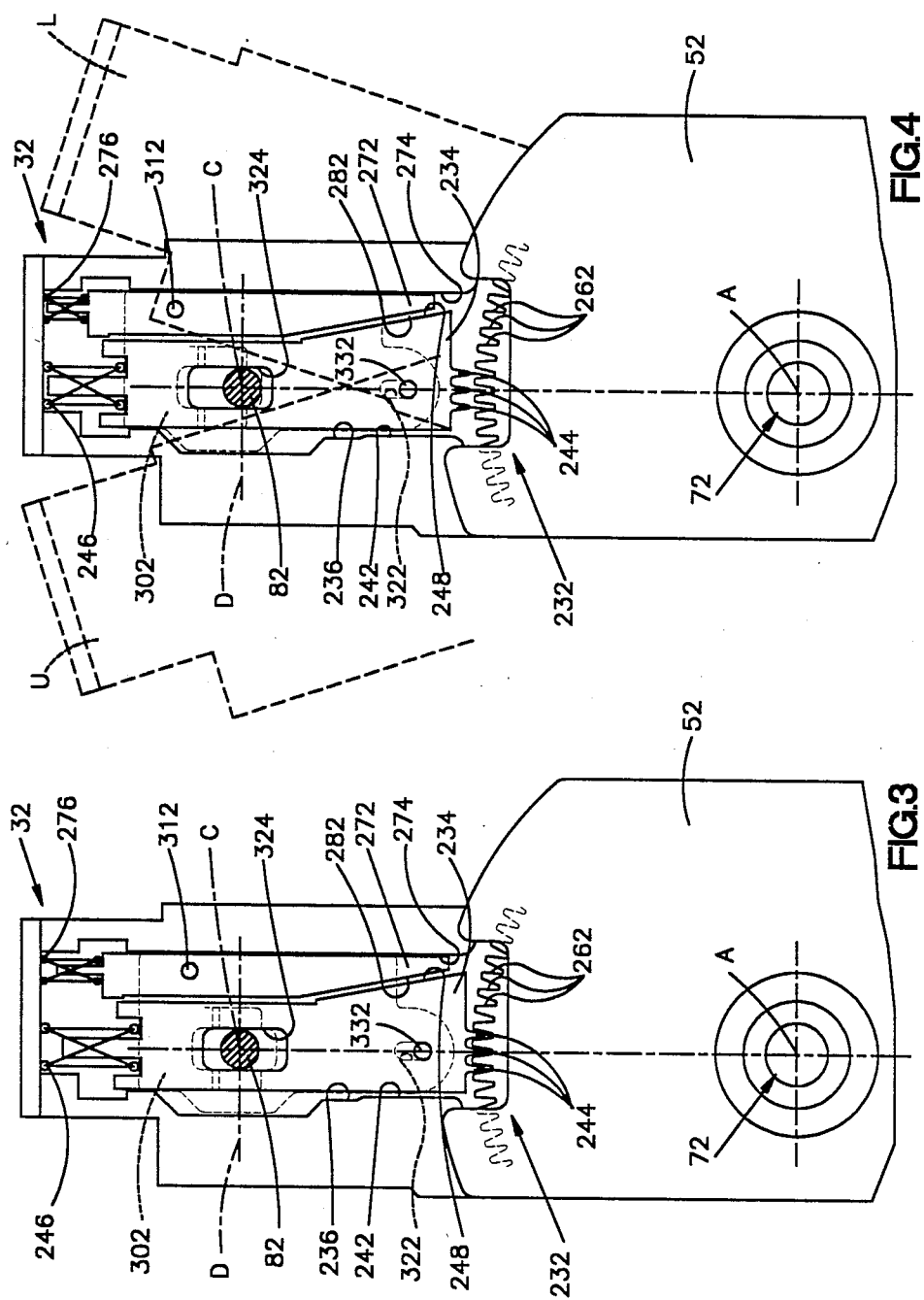

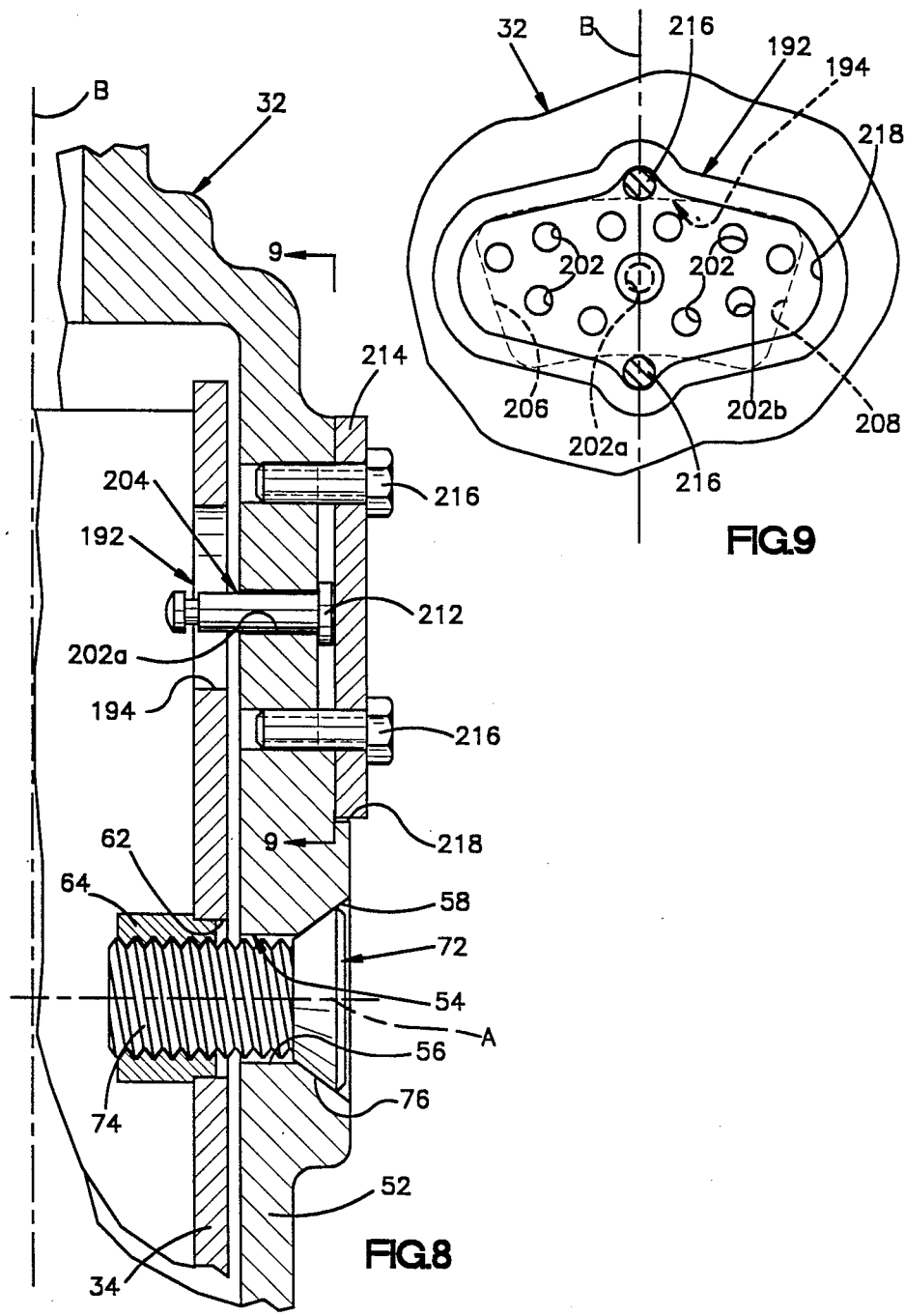

TILT-TELESCOPE STEERING COLUMN

This is a divisional of copending application Ser. No. 07/277,232 filed on Nov. 29, 1988.

BACKGROUND OF THE INVENTION

1. Technical Field

The present invention relates to a steering column for a vehicle, and in particular, to a steering column which is angularly and axially adjustable.

2. Description of the Prior Art

Steering columns which are angularly and axially adjustable are known. U.S. Pat. No. 4,649,769 discloses one such steering column which includes a pair of steering column members. The steering column members are axially movable (telescope) relative to one another and are supported by a bracket for angular movement (tilt) relative to the bracket. The steering column members may be locked in one of a plurality of relative axial positions and in one of a plurality of angular positions relative to the bracket. The steering column includes many cooperating parts. Manufacturing tolerances and wear of the cooperating parts may result in clearance between the cooperating parts. When the steering column is subjected to severe operating conditions, as is encountered in a heavy duty truck or off-road vehicle, clearance between the cooperating parts allows vibration and/or a feel of "looseness" in the steering column to be transmitted to the vehicle operator.

There have been attempts to reduce and eliminate the clearance between cooperating parts in a steering column. For example, U.S. Pat. No. 3,570,322 discloses a telescoping steering column having a hexagonal shaft supported in a tube by a plurality of wedges. Each of the wedges is disposed in a cooperating wedge-shaped channel in the tube. Springs bias the wedges in a direction so an angled surface of each wedge engages an angled surface of a channel to move the wedges radially inwardly and press against the shaft.

U.S. Pat. No. 4,619,548 discloses a telescoping steering column including an inner shaft received in an outer shaft. The outer shaft has internal splines for engaging external splines or the inner shaft. A rod having a tapered end portion is located within a bore in the inner shaft. When a nut is tightened on the rod, the rod moves axially within the inner shaft and expands the external spline against the internal spline to take up clearance.

U.S. Pat. No. 4,033,158 discloses a steering column supported for tilting movement. The steering column includes a rod having an end portion receivable in one of a plurality of notches in a plate. The end portion of the rod has a angled surface for engaging a corresponding angled surface of the one notch. A spring biases the rod toward the plate and the cooperating angled surfaces urge the rod to move in a direction transversely relative to the longitudinal central axis of the rod and against another surface of the notch. Clearance between the end portion of the rod and the notch is, thus, taken up.

SUMMARY OF THE INVENTION

The present invention is directed to a tilt-telescope steering column in which clearance between cooperating parts is reduced and/or eliminated to minimize vibration and the feel of looseness transmitted to the vehicle operator. The steering column of the present invention includes a housing having a pair of spaced apart support portions which are resiliently deflectable. Each of the support portions has an opening which is at least partially defined by a tapered surface. The housing is supported by a bracket for pivotal movement between first and second pivot limits. The bracket has a pair of threaded openings located adjacent the openings in the support portions of the housing.

A pair of screws attach the housing to the bracket and support the housing for pivotal movement relative to the bracket. Each of the screws has a portion for threaded engagement with one of the threaded openings in the bracket and has a tapered portion for engagement with the tapered surface of the opening in a support portion of the housing. As the screws are tightened in the bracket, the tapered surfaces of the screws engage the tapered surfaces of the support portions of the housing and deflect the support portions toward the bracket. The support portions then resiliently deflect away from the bracket to take up clearance between the tapered surfaces of the screws and the tapered surfaces of the openings in the support portions of the housing.

Tilt blocking means for blocking pivotal movement of the housing relative to the bracket includes a lock member carried by the housing. The lock member is movable from a first position blocking relative pivotal movement between the housing and the bracket to a second position allowing relative pivotal movement between the housing and the bracket. A wedge member is also carried by the housing adjacent the lock member. The wedge member is movable in a direction parallel to the direction of movement of the lock member. The wedge member has a surface angled relative to its path of movement for engaging the lock member to move the lock member against a surface of the housing and take up clearance between the lock member and the housing when the lock member is moved to its first position.

A member which is connectable with a steering wheel is located within the housing and is axially movable relative to the housing. A pair of axially spaced bearings are located between the housing and the member and support the member for axial movement relative to the housing. The housing has a pair of frustoconical inner surfaces at axially spaced locations and which face one another. Each of the bearings is circumferentially contractable and has a frustoconical external surface engaging a respective frustoconical inner surface of the housing. A spring urges the bearings to move axially away from one another and against the frustoconical inner surfaces of the housing to circumferentially contract the bearings around the member and take up clearance between the bearings and the member.

Telescope blocking means includes a lock pin which is movable from a first position blocking relative axial movement between the member and the housing to a second position permitting relative axial movement between the member and the housing. A cam member is supported for pivotal movement by the lock pin. The lock member of the tilt blocking means is moved to its second position in response to the cam member pivoting in a first direction. The lock pin of the telescope blocking means is moved to its second position in response to the cam pivoting in a second direction opposite the first direction.

A pin is located in one of a plurality of bores in the housing which extend perpendicular to the path of pivotal movement of the housing. A portion of the pin engages opposite surfaces of an opening in the bracket to block pivotal movement of the housing relative to the bracket at first and second pivot limit positions. The pin can be placed in another one of the plurality of bores in the housing to change the first and second pivot limit positions.

BRIEF DESCRIPTION OF THE DRAWINGS

Further features and advantages of the present invention will become apparent to those skilled in the art to which the present invention relates from reading the following specification with reference to the accompanying drawings, in which:

FIGS. 3 and 4 are enlarged views of a portion of the steering column of FIG. 2 with parts in different positions;

FIG. 8 is an enlarged cross sectional view of another portion of the steering column of FIG. 1;

FIG. 9 is a side view of the portion of the steering column of FIG. 8, taken approximately along line 9—9 of FIG. 8.

DESCRIPTION OF A PREFERRED EMBODIMENT

Figure 1:
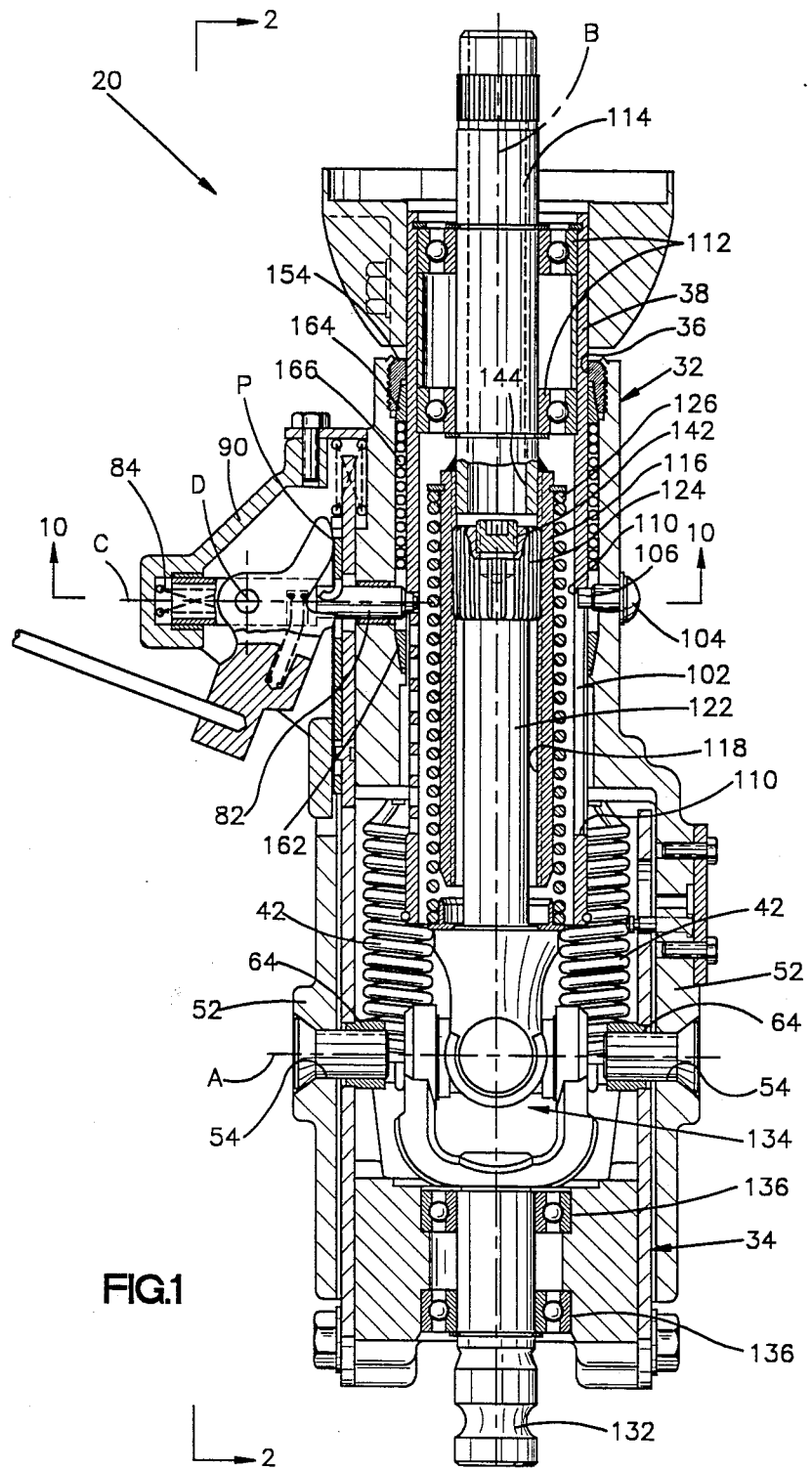
FIG. 1 is a cross sectional view of a tilt-telescope steering column embodying the present invention.
Figure 2:
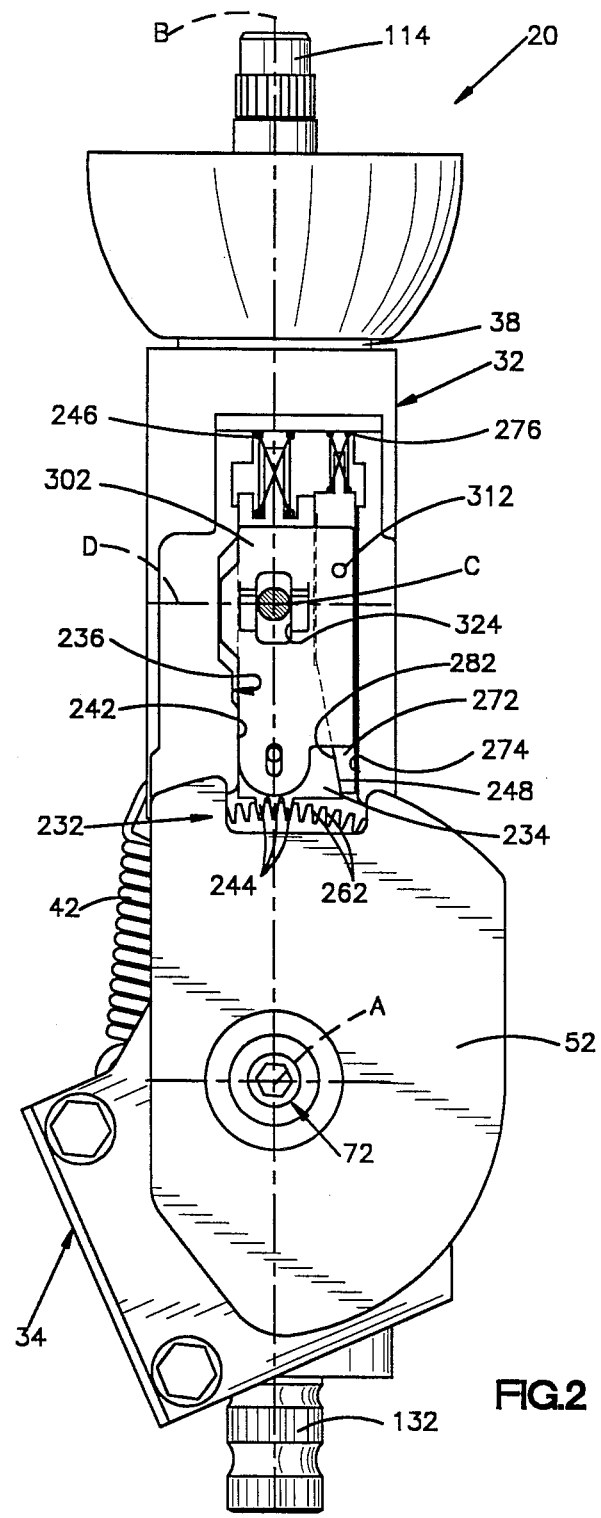
FIG. 2 is a side view of the steering column of FIG. 1, taken along the line 2—2 in FIG. 1.

A tilt-telescope steering column 20 embodying the present invention is illustrated in FIGS. 1 and 2. The steering column 20 includes a housing 32 supported by a bracket 34 which is connectable with a vehicle. The housing 32 is pivotable (tilt) relative to the bracket 34 about a tilt axis A. A chamber defined by a cylindrical bore 36 (FIG. 1) extends axially through the housing 32. A tubular member 38 is received in the bore 36 and is axially movable (telescope) relative to the housing 32 along a longitudinal central axis B of the steering column 20.

Pivotal movement of the housing 32 relative to the bracket 34 permits easy ingress and egress of the vehicle operator and allows the steering wheel to be located in a desired operating position. The housing 32 is pivotable about the axis A between an upper tilt limit U and a lower tilt limit L, as illustrated in FIG. 4. The housing 32 is biased by springs 42 (FIGS. 1 and 2) towards the upper limit U.

The housing 32 is made from a material which is resiliently deflectable and has a pair of oppositely facing support portions 52 (FIG. 1). The bracket 34 is located between the support portions 52 and the support portions deflect in a direction toward and away from the bracket. An opening 54 (FIG. 8) extends through each of the support portions 52. Each of the openings 54 is defined by a cylindrical surface 56 and by an outwardly facing tapered surface 58.

The bracket 34 is preferably fabricated from a relatively rigid material, such as steel. A pair of openings 62 (FIG. 8) are located in opposite sides of the bracket 34 and adjacent the openings 54 in the support portion 52 of the housing 32. An internally threaded tubular member 64 is fixed in each of the openings 62 in the bracket 34.

A pair of screws 72 attach the housing 32 to the bracket 34. Each of the screws 72 has a threaded portion 74 for threaded engagement with a respective threaded member 64 on the bracket 34. Each of the screws 72 also has a frustoconical external surface 76 for engaging the tapered surface 58 of the opening 54 in the support portion 52 of the housing 32. The screws 72 are located coaxially along the tilt axis A with the frustoconical external surfaces 76 facing one another. As each screw 72 is tightened in the threaded member 64, the tapered surface 76 of the screw engages the tapered surface 58 of the opening 54 in the housing 32 and deflects the support portion 52 in a direction toward the bracket 34 and the support portions toward one another. Thus, the tapered surface 76 of the screws 72 engaging the respective tapered portions 58 of the openings 54 act as bearing surfaces supporting the housing 32 for pivotal movement relative to the bracket 34 about the tilt axis A.

Over a period of time, tilting movement of the housing 32 relative to the bracket 34 may result in wear of the tapered surfaces 58, 76. As the tapered surfaces 58, 76 wear, the support portions 52 of the housing 32 resiliently deflect in a direction away from the bracket 34 and away from one another. Thus, clearance due to the wear between the tapered surfaces 58 of the housing 32 and the tapered surfaces 76 of the screws 72 is taken up.

Figure 5:
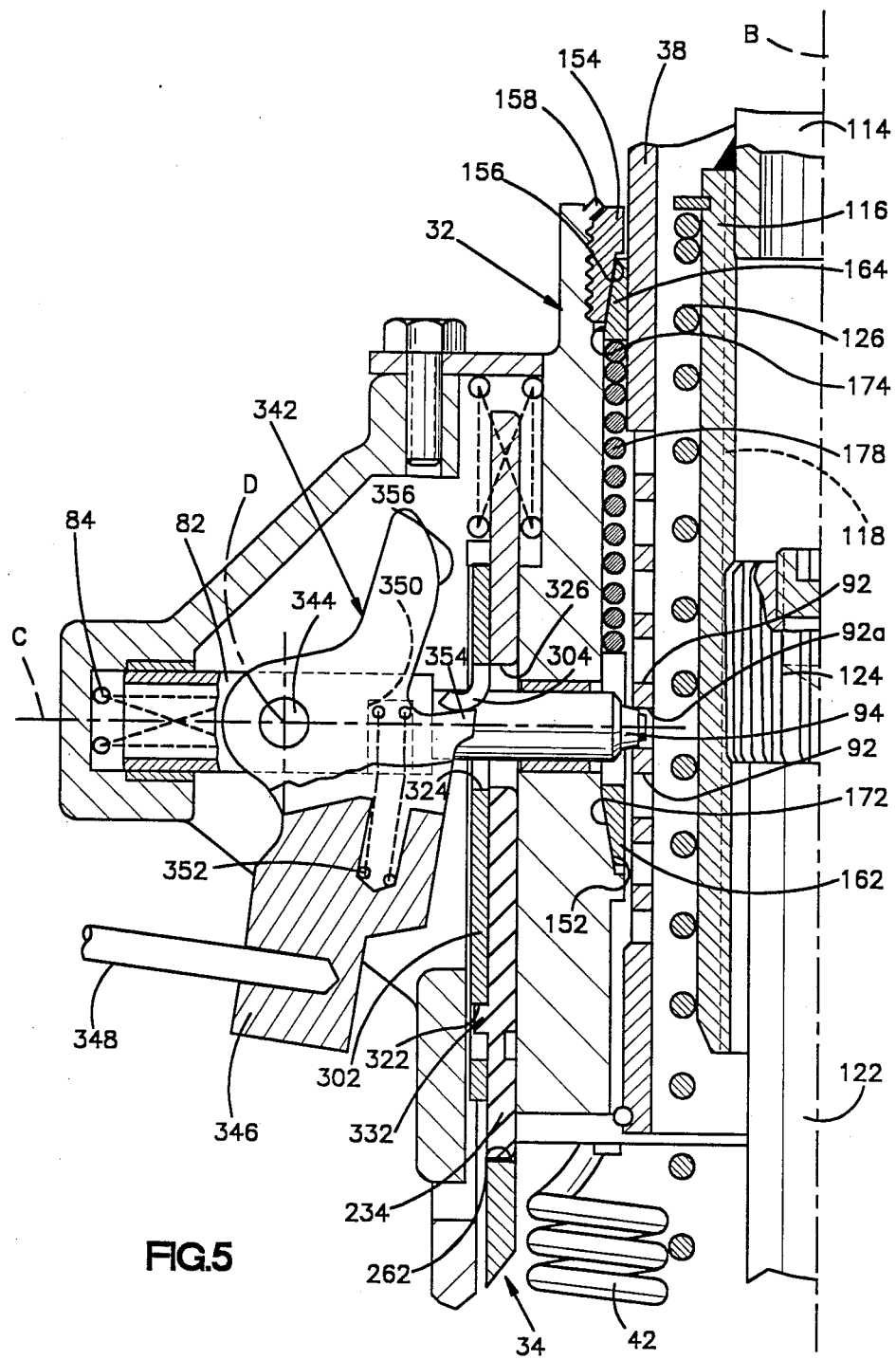
FIGS. 5, 6 and 7 are enlarged cross sectional views of a portion of the steering column of FIG. 1 with parts in different positions.
Figure 7:
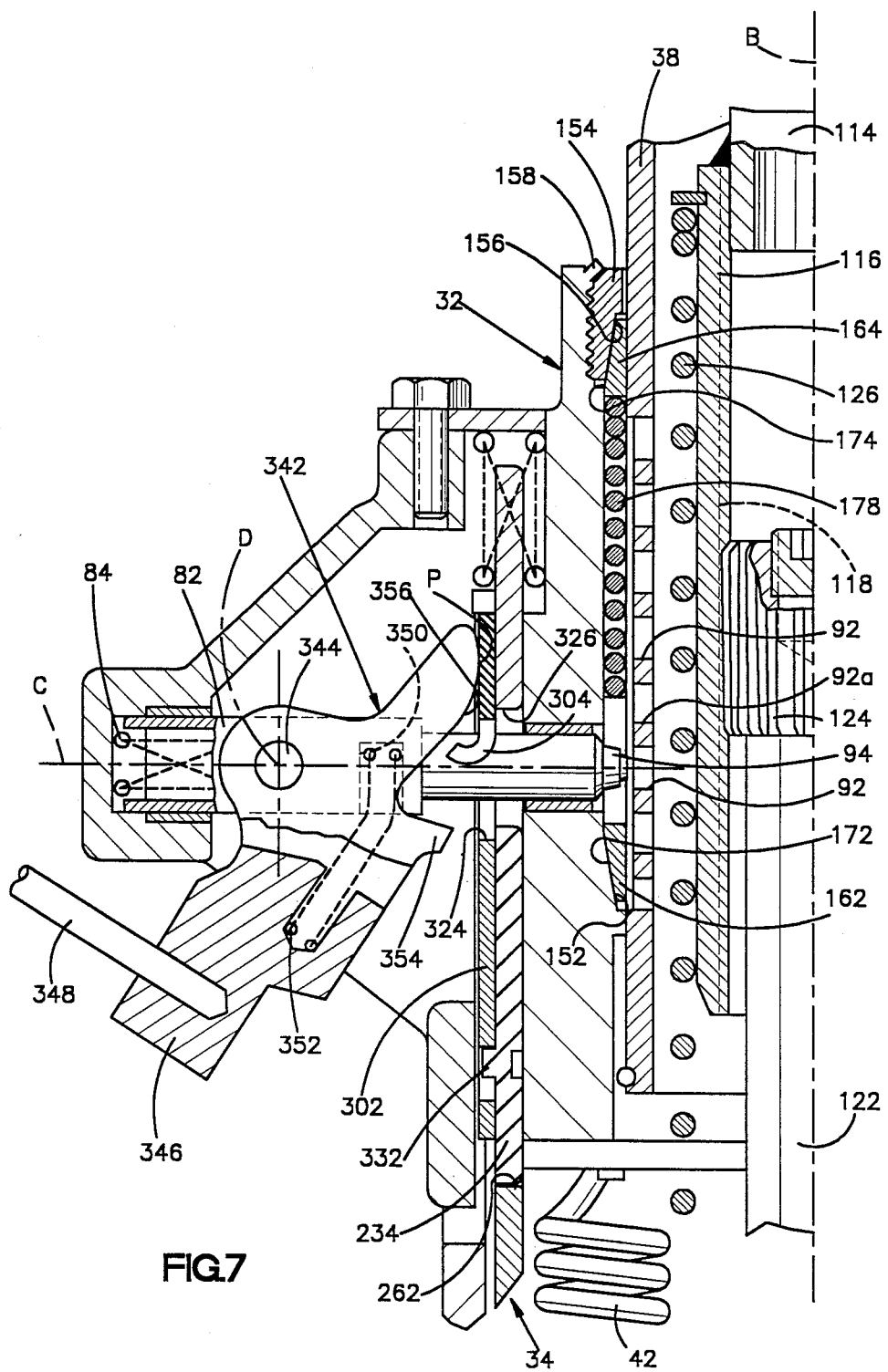

The tubular member 38 (FIG. 1) is blocked from moving axially relative to the housing 32 by a lock pin 82. The lock pin 82 is supported by a portion 90 of the housing 32 for movement along a longitudinal central axis C of the lock pin. The lock pin 82 is biased by a spring 84 toward the tubular member 38. The tubular member 38 has a plurality of longitudinally spaced openings 92 (FIG. 5). An axial end portion 94 of the lock pin 82 is received in one of the openings 92a to block relative axial movement between the tubular member 38 and the housing 32. The lock pin 82 is movable in a direction along the axis C away from the axis B so the axial end portion 94 is no longer received in the opening 92a in the tubular member 38, as illustrated in FIG. 7. Relative axial movement between the tubular member 38 and the housing 32 is, thus, permitted.

Figure 10:
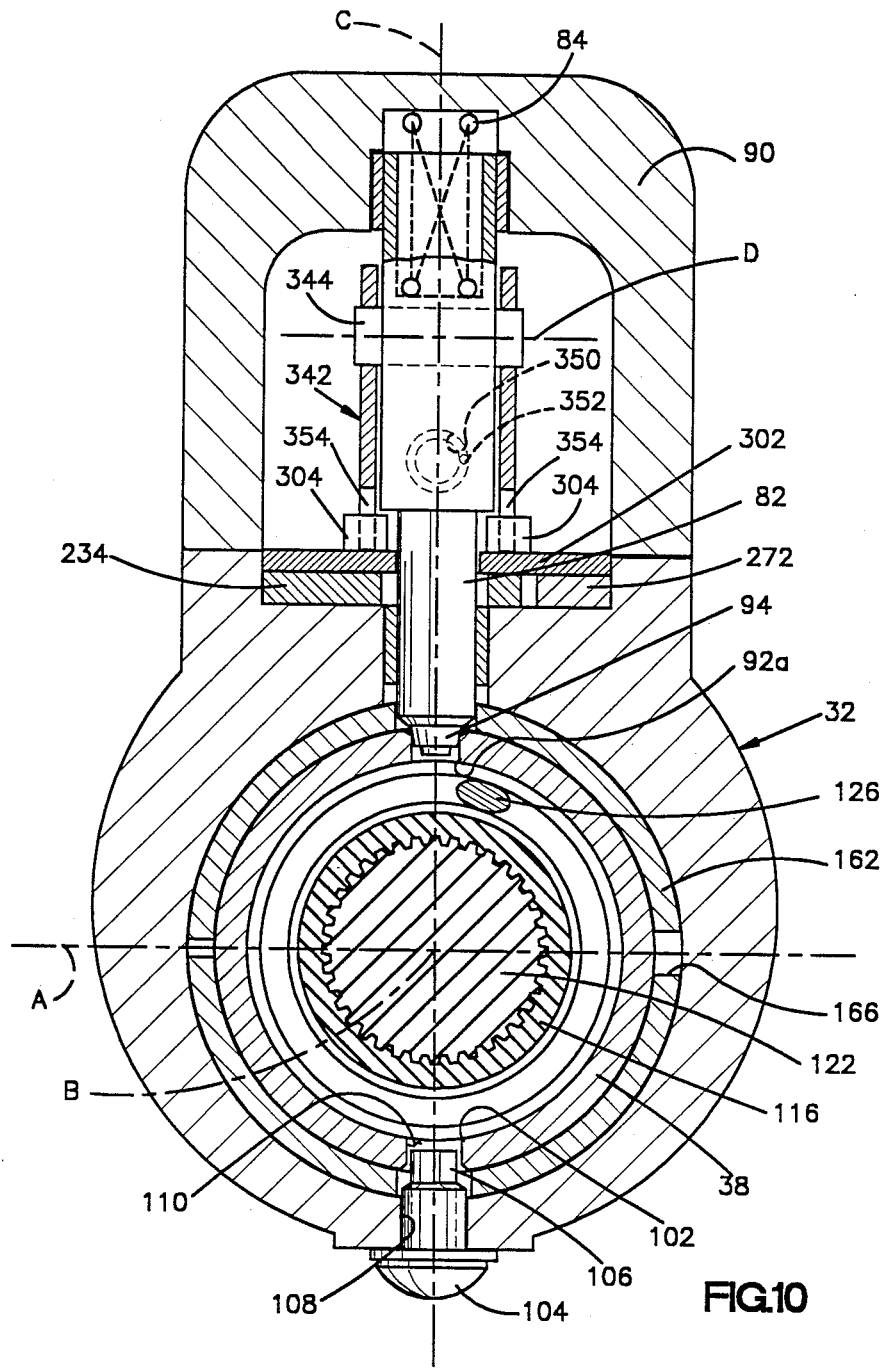
FIG. 10 is an enlarged cross sectional view of the steering column of FIG. 1 taken approximately along line 10—10 in FIG. 1.

An elongate slot 102 (FIGS. 1 and 10) extends longitudinally in the tubular member 38 and is located diametrically opposite the openings 92. A fastener 104 is threaded into an opening 108 in the housing 32 and has an end portion 106 received in the slot 102. The end portion 106 of the fastener 104 is engageable with axially opposite end surfaces 110 of the slot 102 to limit the amount of axial movement of the tubular member 38 relative to the housing 32. The lock pin 82 and fastener 104 also act to block relative rotation of the tubular member 38 within the housing 32.

A pair of axial spaced bearings 112 (FIG. 1) are supported by the tubular member 38. A metal input shaft 114 is supported in the bearings 112 for axial movement with and rotation relative to the tubular member 38. A steering wheel (not shown) is connectable with an axial end of the input shaft 114 extending from the steering column 20, as is known. A metal tube 116 is welded to another axial end of the input shaft 114 and is located coaxially within the tubular member 38. The tube 116 has an internally splined bore 118.

An intermediate shaft 122 has an externally splined end portion 124 received in the bore 118 of the tube 116 for connection with the input shaft 114. The intermediate shaft 122 rotates in response to rotation of the input shaft 114. The tube 116 and input shaft 114 are axially movable relative to the intermediate shaft 122 when the tubular member 38 moves axially relative to the housing 32. A spring 126 is connected between the intermediate shaft 122 and the tube 116 to assist in extending the shaft 114 and tube 116 relative to the intermediate shaft 122.

The intermediate shaft 122 (FIG. 1) is connected to an output shaft 132 of the steering column 20 through a universal joint 134 located along the tilt axis A, as is known. The universal joint 134 permits relative pivotal movement between the intermediate shaft 122 and the output shaft 132 when the housing 32 pivots relative to the bracket 34. The output shaft 132 is supported for rotation by a pair of axially spaced bearings 136 in the bracket 34. Thus, rotation of the input shaft 114 causes rotation of the output shaft 132 through the intermediate shaft 122.

A threaded plug 142 is threaded into an opening in the splined end portion 124 of the intermediate shaft 122. The plug 142 has a tapered exterior surface. Axially extending slots (not shown) are formed in the splined end portion 124 of the intermediate shaft 122. The slots split the splined end portion 124 of the intermediate shaft 122 into segments which are relatively movable. The plug 142 is tightened in the intermediate shaft 122 by a tool extending through a bore 144 in the input shaft 114. The tapered surface of the plug 142 expands the splined end portion 124 of the intermediate shaft 122 against the internal spline 118 of the tube 116 to take up clearance therebetween. Thus, any relative radial movement between the intermediate shaft 122 and tube 116 is minimized or eliminated to reduce vibration and looseness.

The housing 32 has a frustoconical inner surface 152 (FIG. 5) located in the bore 36 which faces in a direction away from the bracket 34. A collar 154 is threaded in an axial end portion of the housing 32 located away from the bracket 34 and is retained by a shoulder 158 of the housing. The collar 154 has a frustoconical inner surface 156 facing toward the frustoconical inner surface 152 of the housing 32.

A pair of circumferentially contractable annular bearings 162, 164 are received in the bore 36 of the housing 32 to take up clearances between the housing 32 and the tubular member 38. Each of the bearings 162, 164 has a longitudinally extending radial split 166 (FIG. 10) and has a frustoconical external surface 172, 174, respectively, located at an axial end of the bearing. Each frustoconical external surface 172, 174 of the bearings 162, 164 engage a respective frustoconical inner surface 152, 156. A spring 178 constantly biases the bearings 162, 164 to move axially in a direction away from one another to thereby maintain the bearings in simultaneous engagement with the housing 32 and the tubular member 38. The frustoconical external surfaces 172, 174 of the bearings are constantly forced against the frustoconical inner surfaces 152, 156 which causes the bearings 162, 164 to circumferentially contract about the outer circumference tubular member 38. Thus, any clearance or wear between the housing 32 the bearings 162, 164 is taken up.

A tilt limit mechanism 192 (FIGS. 8 and 9) blocks relative pivotal movement between the housing 32 and the bracket 34 at the upper tilt limit U and the lower tilt limit L. The tilt limit mechanism 192 includes an arcuate shaped opening 194 (FIG. 9) formed in the bracket 34. The opening 194 is contained in a plane extending parallel to the path of pivotal movement of the housing 32.

A plurality of bores 202 extend through one of the support portions 52 of the housing 32 adjacent the opening 194 in the bracket 34. The bores 202 extend in a direction perpendicular to the path of pivotal movement of the housing 32. A pin 204 (FIG. 8) is removably located in one of the openings 202 in the housing 32 and extends into the arcuate opening 194 in the bracket 34. When the pin 204 engages a radial side surfaces 206 or 208 (FIG. 9) of the opening 194, relative pivotal movement between the housing 32 and the bracket 34 is blocked at a respective tilt limit U, L.

A flange 212 is fixed to an axial end of the pin 204. The flange 212 engages the support portion 52 to block the pin 204 from moving relative to the support portion in a direction toward the axis B. A plate 214 is located in a recess 218 in the support portion 52 and is connected by fasteners 216 to the support portion. The plate 214 engages the flange 212 to block movement of the pin 204 relative to the support portion 52 in a direction away from the axis B.

To change the tilt limits U, L, the pin 204 is removed from the bore 202a and reinserted into, for example, bore 202b (FIG. 9). The pin 204 now engages the radial surfaces 206, 208 of the opening 194 when the housing 32 is at a different upper and lower tilt limits relative to the bracket 34 than the tilt limits U, L corresponding to the pin being in the bore 202a. However, the total amount of relative pivotal movement of the housing 32 remains approximately the same. It will be apparent that a pair of pins 204 may be used. For example, one pin 204 may be located in opening 202a and the other pin 204 may be located in opening 202b. When the housing 32 pivots to its upper limit U, as viewed in FIG. 4, the pin 204 located in opening 202a engages the radial surface 206 (FIG. 9) to block pivoting of the housing relative to the bracket 34 at the upper limit. When the housing 32 pivots to its lower limit L, the pin 204 located in opening 202b engages the surface 208 to block pivoting of the housing relative to the bracket 34 at the lower limit. Thus, a manufacturer of the steering column 20 can locate the pin or pins 204 during assembly to suit a particular vehicle application.

A tilt lock mechanism 232 (FIG. 2) blocks relative pivotal movement between the housing 32 and the bracket 34 between the tilt limits U, L. As illustrated in FIGS. 2-4, the tilt lock mechanism 232 includes a locking plate 234 located in a generally rectangular shaped opening 236 in the housing 32. The opening 236 is contained in a plane extending perpendicular to the tilt axis A. The locking plate 234 is located adjacent a lateral side surface 242 of the opening 236.

The locking plate 234 is movable in a path toward and away from the bracket 34 and parallel to the axis B. Three teeth 244 extend from an axial end of the locking plate 234 in a direction toward the bracket 34. The locking plate 234 is biased by a spring 246 toward the bracket 34. A surface 248 on the locking plate 234 is located at an acute angle relative to the path of movement of the locking plate. The locking plate 234 is movable from the position illustrated in FIG. 2 in which relative pivotal movement between the housing 32 and the bracket 34 is blocked to the position illustrated in FIG. 4 in which relative tilting movement between the housing and the bracket is allowed.

A plurality of notches 262 are located in the bracket 34 and face in a direction toward the locking plate 234. When the teeth 244 of the locking plate 232 enter and engage respective notches 262 in the bracket 34, relative pivotal movement between the housing 32 and the bracket 34 is blocked, as illustrated in FIG. 2. When the teeth 244 of the locking plate 234 are disengaged from the notches 262 in the bracket 34, the housing 32 may pivot about the axis A relative to the bracket 34 between the tilt limits U and L, as illustrated in FIG. 4.

The tilt lock mechanism 232 also includes a wedge plate 272 located in the opening 236. The wedge plate 272 is located adjacent another lateral side surface 274 of the opening 236. The wedge plate 272 is movable in a direction parallel to the path of movement of the locking plate 234 and is biased toward the bracket 34 by a spring 276. The wedge plate 272 has an angled surface 282 located adjacent the surface 248 on the locking plate 234. When the teeth 244 of the locking plate 234 are engaged with the notches 262 in the bracket 34 and the wedge plate 272 is moved toward the bracket 34, the surface 282 on the wedge plate engages the surface 248 on the locking plate to move the locking plate transversely to its path of movement, to the left as viewed in FIG. 2, against the lateral side surface 242 of the opening 236. Concurrently, the wedge plate 272 moves to the right, transversely to the path of movement of the wedge plate and engages the lateral side surface 274 of the opening 236. Clearance between the locking plate 234 and the housing 32 is eliminated so pivotal movement of the housing 32 relative to the bracket 34 which is felt as "looseness" by the operator is also eliminated.

The tilt lock mechanism 232 also includes an actuator plate 302 located in the opening 236 in the housing 32. The actuator plate 302 is preferably made from stamped steel. The actuator plate 302 is located adjacent the locking plate 234 and the wedge plate 272 and extends in a direction parallel to a plane containing the locking plate and the wedge plate. A pair of tabs 304 (FIGS. 5 and 10) extend from the actuator plate 302 in a direction away from the axis B.

A pin 312 (FIG. 2) extends from the wedge plate 272 and into an opening in the actuator plate 302. The wedge plate 272 is, thus, connected to the actuator plate 302 for joint movement. A pair of elongate openings 322, 324 extend through the actuator plate 302. The openings 322, 324 each have a longitudinal central axes which extend in a direction parallel to the axis B. The lock pin 82 extends through the opening 324 in the actuator plate 302 and through an opening 326 in the locking plate 234. The openings 324, 326 provide clearance between the plates 302 and 234 and the lock pin 82 during movement of the plates and lock pin.

A projection 332 (FIGS. 2 and 5) extends from the locking plate 234 and into the elongate opening 322 in the actuator plate 302. When the teeth 244 on the locking plate 234 engage the notches 262 in the bracket 34, the projection 332 is located near an axial end of the opening 322 located away from the bracket, as illustrated in FIG. 2. When the actuator plate 302 moves in a direction away from the bracket 34, the wedge plate 272 moves with the actuator plate. The tapered surface 282 of the wedge plate 272 disengages the tapered surface 248 of the locking plate 234. The locking plate 234 is, thus, no longer forced against the lateral side surface 242 of the opening 236 in the housing 32, as illustrated in FIG. 3. When the actuator plate 302 moves a predetermined distance away from the bracket 34, the projection 332 engages the other axial end of the elongate opening 322 located closest to the bracket, as illustrated in FIG. 3. Upon further movement of the actuator plate 302 away from the bracket 34, the locking plate 234 is pulled away from the bracket 34 so the teeth 244 on the locking plate disengage the notches 262 in the bracket, as illustrated in FIG. 4.

After the housing 32 pivots relative to the bracket 34 to a desired position, the actuator plate 302 is moved toward the bracket 34. The teeth 244 on the locking plate 234 engage the notches 262 in the bracket 34 to block relative pivotal movement of the housing 32 relative to the bracket from the desired position and the locking plate stops moving. Upon further movement of the actuator plate 302 toward the bracket 34, the wedge plate 272 moves toward the bracket and the angled surface 282 engages the surface 248 of the locking plate 234 to move the locking plate against the lateral side surface 242 of the opening 236 in the housing 32.

Figure 6:
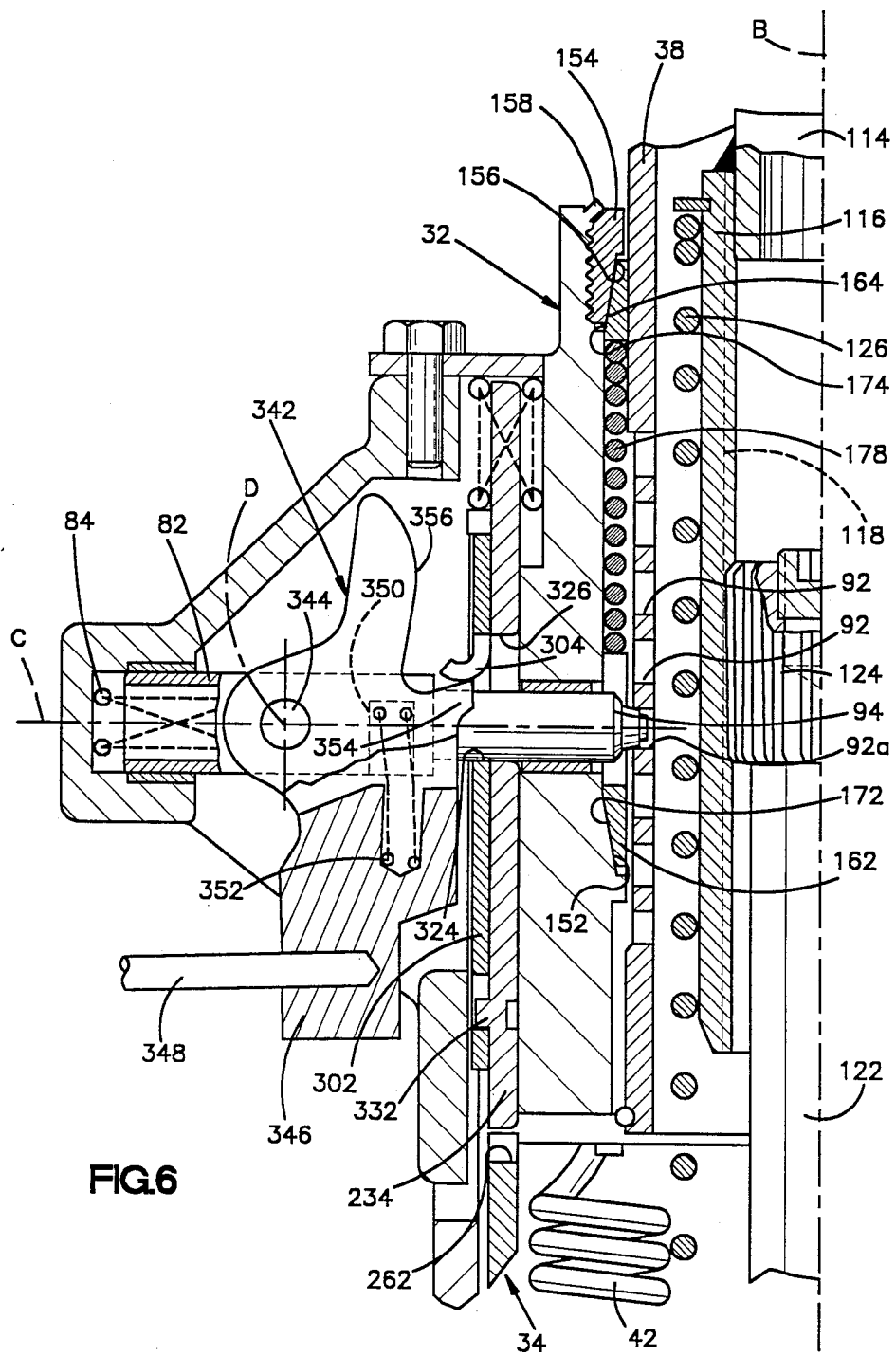

A cam member 342 (FIG. 5) is supported for pivotal movement about an axis D by a shaft 344 received in the lock pin 82. The cam member 342 has a portion 346 which is connected to a lever 348 that is manually operable by the vehicle operator to pivot the cam member in opposite directions from a neutral or initial position as illustrated in FIG. 1. The cam member 342 is biased toward the initial position by a spring 352 received in an opening 350 in the pin 82. When the vehicle operator pivots the cam member 342 counterclockwise about the axis D, as viewed in FIG. 5, by moving the lever 348 in a direction toward the bracket 34, a pair of cam surfaces 354 (FIGS. 5 and 10) on the cam member engage the tabs 304 on the actuator plate 302, as illustrated in FIG. 5. During further counterclockwise movement of the cam member 342 from the position illustrated in FIG. 5 to the position illustrated in FIG. 6, the actuator plate 302 moves in a direction away from the bracket 34 to actuate the tilt lock mechanism 232, as described above, to allow pivotal movement of the housing 32 relative to the bracket 34.

When the vehicle operator moves the lever 348 in a direction away from the bracket 34, the cam member 342 pivots clockwise about the axis D, as viewed in FIG. 1, from the initial position illustrated in FIG. 1. When the cam member 342 pivots clockwise from the position illustrated in FIG. 1 to the position illustrated in FIG. 7, a convex cam surface 356 on the cam member engages the actuator plate 302 at contact point P. During further clockwise pivotal of the cam member 342, the cam surface 356 slides along the actuator plate 302 and forces the lock pin 82 and the axis D of the cam member to move in a direction away from the axis B. As the lock pin 82 moves away from the axis B, the contact point P moves closer to the axis C. When the lock pin 82 moves a predetermined distance away from the axis B, the axial end portion 94 of the lock pin moves out of one of the openings 92 in the tubular member 38 and the tubular member may move axially relative to the housing 32, as described above. When the desired relative axial position is established, the operator releases the lever 348 and the spring 352 biases the lever 348 and cam member 342 back to the initial position illustrated in FIG. 1. The spring 84 urges the lock pin 82 toward the axis B so that the axial end portion 94 of the lock pin enters one of the plurality of openings 92 in the tubular member 32 to block relative axial movement between the tubular member 38 and the housing 32.

From the above description of a preferred embodiment of the invention, those skilled in the art will perceive improvements, changes and modifications. Such improvements, changes and modifications within the skill of the art are intended to be covered by the appended claims.

Having described a preferred embodiment of the present invention, we claim:

1. An apparatus comprising;
a first member defining a chamber;
a second member located within said chamber of said first member and being axially movable relative to said first member;
a pair of axially spaced circumferentially contractable bearings located between said first and second members, each of said bearings simultaneously engaging both of said first and second members;
means for contracting said bearings to take up clearance between each of said bearings and said second member;
said means for contracting said bearings including a frustoconical outer surface on each of said bearings, a pair of axially spaced frustoconical inner surfaces located in said chamber of said first member and facing one another, said frustoconical outer surfaces of said bearings facing in a direction away from one another for engaging a respective one of said frustoconical inner surfaces of said first member, and a spring located between said bearings for urging said bearings axially away from one another against the frustoconical inner surfaces of said first member and to thereby circumferentially contract around said second member; and
each of said bearings comprising a ring shaped member having a longitudinally extending radial split to allow circumferential contraction, said frustoconical outer surfaces of said ring-shaped members being located adjacent axial ends of said ring-shaped members.

2. A steering column assembly comprising:
a first member defining a chamber;
a second member located within said chamber of said first member and being axially movable relative to said first member;
a pair of axially spaced contractable bearings located between said first and second members, each of said bearings comprising a ring shaped member having a longitudinally extending radial split to allow circumferential contraction of said ring shaped member, each of said bearings simultaneously engaging both of said first and second members; and
means for contracting said bearings to take up clearance between said first member and said bearings.

3. The assembly set forth in claim 2 wherein said means for contracting said bearings includes a frustoconical outer surface on each of said bearings, a pair of axially spaced frustoconical inner surfaces located in said chamber of said first member and facing one another, said frustoconical outer surfaces of said bearings facing in a direction away from one another for engaging a respective one of said frustoconical inner surfaces of said first member, and a spring located between said bearings for urging said bearings axially away from one another against said frustoconical inner surfaces of said first member for said bearings to thereby circumferentially contract around said second member.

4. The apparatus set forth in claim 3 wherein each frustoconical outer surface of a bearing is located on a ring-shaped member adjacent an axial end of the ring-shaped member.

5. A steering column assembly for a vehicle having a steering wheel rotatable by vehicle occupant, said steering column assembly comprising;
a housing having an axis and an inner surface defining a chamber;
a tubular member having an outer surface;
means supporting said tubular member for movement in said chamber along said axis, and for preventing rotation of said tubular member relative to said housing about said axis;
a steering shaft supported in said tubular member for movement along said axis with said tubular member and for rotation about said axis relative to said tubular member in response to rotation of the vehicle steering wheel;
a pair of contractable bearings; and
means for supporting said bearings in positions between said outer surface of said tubular member and said inner surface of said housing, and for contracting said bearings to take up clearance between said bearings and said inner surface of said housing.

6. A steering column assembly as defined in claim 5 wherein each of said bearings comprises a ring having a longitudinally extending radial split to allow circumferential contraction of the ring.

7. A steering column assembly as defined in claim 6 wherein said rings are axially incompressible.

* * * * *